Patented Apr. 5, 1949

2,466,523

UNITED STATES PATENT OFFICE 2,466,523

METHINE DYES CONTAINING AN ISOQUINOLINE NUCLEUS

Frank L. White and Leslie G. S. Brooker, Rochester, N. Y., assignors to Eastman Kodak Company, Rochester, N. Y., a corporation of New Jersey No Drawing. Application May 25, 1946, Serial No. 672,340

5 Claims. (Cl. 260—240)

This invention relates to methine dyes containing an isoquinoline nucleus and to a process for preparing said dyes.

A few cyanine dyes which contain a 1-isoquinolyl group are known. See Hamer and Fischer, J. Chem. Soc. 1934, 1905. However, methine dyes containing a 3-isoquinolyl group have not been prepared; in fact experiments having as their object the preparation of methine dyes from 3-methylisoquinoline alkyl quaternary salts have been uniformly unsuccessful. See Mills and Smith, J. Chem. Soc. 121, 2724 (1922).

We have now found, however, that certain methine dyes can be prepared from 3-methylisoquinoline alkyl quaternary salts. It is, therefore, an object of our invention to provide new methine dyes and a process for preparing the same. Other objects will become apparent hereinafter.

In accordance with our invention, we provide styrylisoquinoline dyes which are represented by the following general formula:

I.

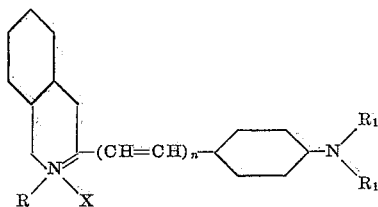

wherein R and $R_1$ each represents an alkyl group, i. e. an alcohol radical, e. g. methyl, ethyl, n-propyl, isobutyl, n-butyl, β-hydroxyethyl, β-ethoxyethyl, allyl, benzyl, β-phenylethyl, β-acetylethyl, β-acetoxyethyl, etc. and X represents an anion, e. g. chloride, bromide, iodide, p-toluenesulfonate, methylsulfate, ethylsulfate, benzenesulfonate, acetate, perchlorate, thiocyanate, etc., and n represents a positive integer of from 1 to 2.

To provide the dyes of the above general formula I, we condense a 3-methylisoquinoline alkyl quaternary salt selected from those represented by the following general formula:

II.

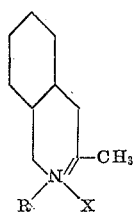

wherein R and X have the values set forth above, with a p-dialkylaminobenzaldehyde or p-dialkylaminocinnamaldehyde selected from those represented by the following general formula:

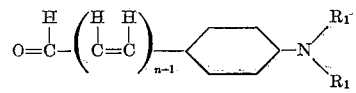

wherein $R_1$ and n have the values set forth above.

The condensations are effected by heating the 3-methylisoquinoline alkyl quaternary salt with the p-dialkylaminobenzaldehyde or p-dialkylaminocinnamaldehyde in a base selected from the group consisting of pyridine, quinoline and isoquinoline, in the presence of a secondary amine having an ionization constant greater than $10^{-5}$ at 25° C., e. g. piperidine, 2-methylpiperidine, etc. The condensation can also be effected in an alcohol, e. g. ethyl, n-propyl or n-butyl alcohol, in the presence of piperidine.

The following example will serve to illustrate further the manner of obtaining our new dyes.

*Example 1.—3-p-dimethylaminostyrylisoquinoline ethiodide*

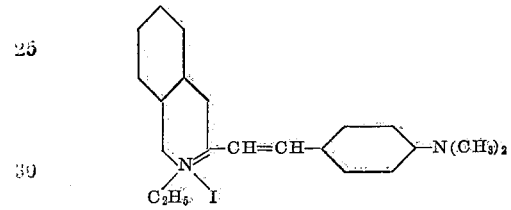

1.43 g. (1 mol.) of 3-methylisoquinoline and 1.54 g. (1 mol.) of ethyl sulfate were heated together at the temperature of the steam bath for 7 hours. The crude quaternary salt was dissolved in 15 cc. of hot pyridine, and then 1.49 g. (1 mol.) of p-dimethylaminobenzaldehyde and 0.2 cc. of piperidine were added. The reaction mixture was heated at the refluxing temperature for 30 minutes. To the hot reaction mixture was added a hot solution of potassium iodide (5 g.) in water (50 cc.). After chilling at 0° C., the solid was collected on a filter and washed with hot water. The residue on the filter was stirred in a beaker, with hot acetone. After chilling at 0° C., the dye was filtered off and washed on the filter with acetone. The yield of dye was 7% crude and 4% after two recrystallizations from methyl alcohol (100 cc. per gram of dye). The minute reddish crystals had melting point 271–272° C. with decomposition, and they sensitized a photographic gelatino-silver-chlorobromoiodide emulsion to about 585 mµ with maximum sensitivity at about 520 mµ.

In like manner, 3-p-dimethylaminostyrylisoquinoline methiodide was prepared from 3-methylisoquinoline metho-p-toluenesulfonate by converting the dye p-toluenesulfonate to its iodide.

The reddish-orange crystals from methyl alcohol (180 cc. per gram of dye) had melting point 285-286° C. with decomposition, and they sensitized a photographic gelatino-silver-chlorobromoiodide emulsion to about 590 mμ with maximum sensitivity at about 520 mμ.

Similarly, 3-p-diethylaminostyrylisoquinoline methoperchlorate was prepared from 3-methylisoquinoline methomethylsulfate and p-diethylaminobenzaldehyde by converting the dye methylsulfate to its perchlorate. The dye was very soluble and it crystallized very slowly. The reddish crystals decomposed from about 200° C.

In a manner similar to that illustrated in the foregoing example, 3-p-di-n-propylaminostyrylisoquinoline ethiodide, 3-p-dimethylaminostyryl isoquinoline n-propiodide, 3-p-dimethylaminostyrylisoquinoline n-butiodide, 3-p-dimethylaminostyrylisoquinoline methoperchlorate, etc. can be prepared.

*Example 2.—3-[4-(p-dimethylaminophenyl)-1,3-butadienyl] isoquinoline ethoperchlorate*

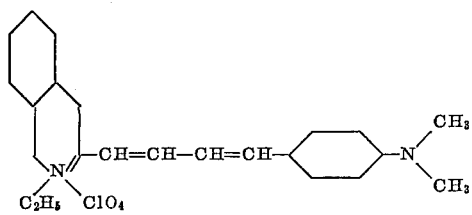

0.3 cc. of piperidine was added to the suspension of 2.99 g. (1 mol.) of 3-methylisoquinoline ethiodide and 1.75 g. of p-dimethylaminocinnamaldehyde in 25 cc. of ethyl alcohol and the reaction mixture was heated at the refluxing temperature for 30 minutes. The cold dye-mixture was stirred with ether. After chilling, the ether-alcohol layer was decanted. The residue was dissolved in hot methyl alcohol and the dye was converted to the perchlorate by adding a hot aqueous solution of sodium perchlorate in excess. After chilling at 0° C., the solid was collected on a filter and it was washed with hot water. The solid was transferred to a beaker, stirred with hot methyl alcohol and the whole chilled at 0° C. The dye was collected on a filter and washed with methyl alcohol. The yield of dye was 34% crude and 6% after two recrystallizations from methyl alcohol (170 cc. per gram of dye). The dull reddish crystalline powder had melting point 241-243° C. with decomposition, and they sensitized a photographic gelatino-silver-chlorobromoiodide emulsion to about 570 mμ with maximum sensitivity at about 510 mμ.

In a manner similar to that illustrated in the foregoing Example 2, 3-[4-(p-diethylaminophenyl)-1,3-butadienyl]-isoquinoline methiodide and methoperchlorate, 3-[4-(p-dimethylaminophenyl) - 1,3 - butadienyl]-isoquinoline n-propiodide and n-properchlorate, 3-[4-(p-dimethylaminophenyl) - 1,3 - butadienyl] - isoquinoline n-butiodide and n-butoperchlorate, etc. can be prepared.

Any of the 3-p-dialkylaminostyrylisoquinoline quaternary iodides or the 3-[4-(p-dialkylaminophenyl)-1,3-butadienyl]-isoquinoline quaternary iodides obtained according to the foregoing examples can be converted to the corresponding quaternary acetates by heating a methyl alcoholic suspension of the iodide with silver acetate, filtering off the silver salts and separating the quaternary acetates from the resulting solution.

We have also found that 3-methylisoquinoline alkyl quaternary salts, unlike 1-methylisoquinoline alkyl quaternary salts, can be condensed with trialkyl orthoformates to give carbocyanine dyes which can be represented by the following general formula:

III.

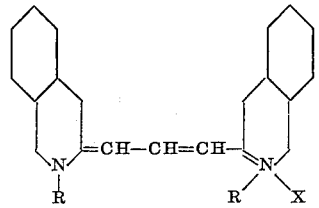

wherein R and X have the values given above, if the condensation is carried out in the presence of isoquinoline. In the presence of pyridine or quinoline, the dyes have not been isolated. Any of the 3-methylisoquinoline alkyl quaternary salts, e. g. those given under Formula II above, can be employed. Among the trialkyl orthoformates, triethyl orthoformate, tri-n-propyl orthoformate and tri-n-butyl orthoformate are advantageously employed. These new dyes sensitize photographic silver halide emulsions.

The following example will serve to illustrate further the manner of obtaining our new carbocyanine dyes.

*Example 3.—2,2'-diethyl-3,3'-isoquinocarbocyanine iodide*

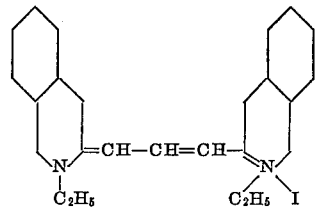

A mixture of 5.98 g. (2 mols.) of 3-methylisoquinoline ethiodide, 4.44 g. (1 mol. + 200% excess) of ethyl orthoformate and 1.01 g. (1 mol.) of triethylamine in 15 cc. of isoquinoline was heated at the refluxing temperature for 15 minutes. The cool crude reaction mixture was stirred with ether (250 cc.) and the whole chilled at 0° C. The ether-isoquinoline layer was decanted, the residue was washed with ether and then warm water. The remaining portion was stirred, in a beaker, with hot acetone. After chilling the suspension, the dye was collected on a filter and washed with acetone. After one recrystallization from methyl alcohol the dark crystals had melting point above 320° C. The dye sensitized a photographic gelatino-silver-bromoiodide emulsion to about 580 mμ.

In the manner illustrated in the foregoing example, 2,2'-dimethyl-3,3'-isoquinocarbocyanine iodide, 2,2'-di-β-hydroxyethyl-3,3'-isoquinocarbocyanine iodide, 2,2'-di-β-ethoxyethyl-3,3'-isoquinocarbocyanine iodide, 2,2'-di-n-butyl-3,3'-isoquinocarbocyanine iodide, etc. can be prepared.

We have also found that 3-methylisoquinoline alkyl quaternary salts can be condensed with pyrrole aldehydes to give pyrrolocarbocyanine salts (or dyes) which can be represented by the following general formula:

IV.

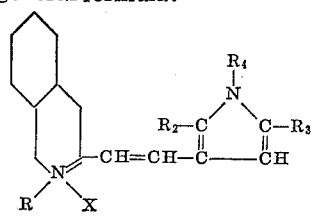

wherein R and X each have the values given above, $R_2$ and $R_3$ each represents an alkyl group, especially a methyl group, and $R_4$ represents an alkyl group, e. g. methyl, ethyl, n-butyl, isobutyl, n-heptyl, lauryl, cetyl, benzyl, etc. or an aryl group, e. g. phenyl.

To provide pyrrolocarbocyanine dyes of the above general Formula IV, we condense a 3-methylisoquinoline alkyl quaternary salt selected from those represented by the above general Formula II with a pyrrole aldehyde selected from those represented by the following general formula:

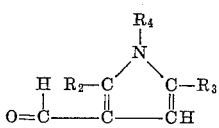

wherein $R_2$, $R_3$ and $R_4$ have the values given above. The condensations are advantageously carried out in the presence of an amine, e. g. piperidine, or a carboxylic anhydride, e. g. acetic anhydride.

The following example will serve to illustrate further the manner of obtaining our new pyrrolocarbocyanine dyes.

*Example 4.—2,2',5' - trimethyl - 1' - phenyl - 3 - isoquino - 3' - pyrrolocarbocyanine perchlorate*

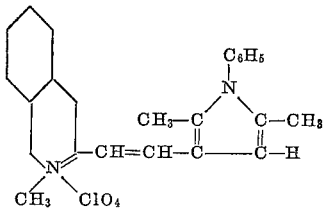

1.43 g. (1 mol.) of 3-methylisoquinoline and 1.26 g. (1 mol.) of dimethyl sulfate were allowed to react at room temperature, and when the reaction had subsided, the mixture was heated at the temperature of the steam bath for 2 hours. After adding 15 cc. of pyridine and 1.99 g. (1 mol.) of 2,5-dimethyl-1-phenyl-3-pyrrolecarboxaldehyde to the crude quaternary salt, the reaction mixture was heated to the boiling point, and 0.2 cc. of piperidine was added. The reaction mixture was heated at the refluxing temperature for 35 minutes, and it was then treated with a hot aqueous solution of sodium perchlorate. After chilling at 0° C., the aqueous pyridine layer was decanted and the residue stirred with hot water to dissolve unreacted quaternary salt. The aqueous layer was decanted and the dark oily product became solid after being stirred with several portions of cold water. This solid was stirred with hot ethyl alcohol (45 cc.), and after chilling at 0° C., the dye was collected on a filter and washed with ethyl alcohol. The yield of dye was 8% crude and 4% after two recrystallizations from methyl alcohol (435 cc. per gram of dye). The orange crystals had melting point 283–284° C. with decomposition, and they sensitized a photographic gelatino - silver - chlorobromoiodide emulsion to about 510 m$\mu$.

In like manner, 2 - ethyl - 2',5' - dimethyl - 1' - phenyl-3-isoquino-3'-pyrrolocarbocyanine perchlorate was prepared from 3-methylisoquinoline etho-ethylsulfate. The orange crystals of the dye had melting point 280–281° C. with decomposition, and they sensitized a photographic gelatino-silver-chlorobromoiodide emulsion to 510 m$\mu$.

In a manner similar to that illustrated in the foregoing examples, 1'-lauryl-2,2',5'-trimethyl-3-isoquino-3'-pyrrolocarbocyanine perchlorate, 1',2 - diethyl - 2',5' - dimethyl - 3 - isoquino - 3' - pyrrolocarbocyanine perchlorate, 2 - $\beta$ - hydroxyethyl - 1' - lauryl - 2',5' - dimethyl - 3 - isoquino - 3' - pyrrolocarbocyanine perchlorate, 2 - $\beta$ - ethoxyethyl - 1' - ethyl - 2',5' - dimethyl - 3 - isoquino - 3' - pyrrolocarbocyanine perchlorate, etc. can be prepared.

The 3-methylisoquinoline alkyl quaternary salts used in practicing our invention can be prepared by reacting (usually with heating) 3-methylisoquinoline with the appropriate alkyl salt. Thus, 3-methylisoquinoline can be reacted with dimethyl or diethyl sulfate as shown in the preceding examples. Likewise it can be heated with methyl or ethyl p-toluenesulfonate to give the metho-p-toluenesulfonate or etho-p-toluenesulfonate. Similarly it can be heated with n-butyl chloride, n-propyl bromide, $\beta$-hydroxyethyl bromide, $\beta$-ethoxyethyl bromide, ethyl iodide, etc. to give the quaternary salts. The following example will serve to illustrate further the formation of 3-methylisoquinoline ethiodide.

*Example 5.—3-methylisoquinoline ethiodide*

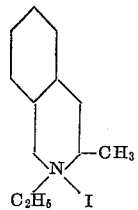

14.3 g. (1 mol.) of 3-methylisoquinoline and 23.4 g. (1 mol.+50% excess) of ethyl iodide were heated together at the refluxing temperature for about 7 hours. The cake of crystals was broken up, ground to a fine crystalline powder and stirred with acetone. The suspension was filtered and the residue was washed with acetone. The yield of pale yellow crystals was 29.4 g. and they had melting point 181–182° C. A portion of this quaternary salt was twice recrystallized from ethyl alcohol (about 3 cc. per gram of salt).

To prepare photographic emulsions sensitized with our new dyes, it is only necessary to disperse the dyes in the emulsions. It is convenient to add the dyes to the emulsions from solutions in appropriate solvents. Methyl alcohol has proven satisfactory for this purpose. Sensitization by means of these dyes is, of course, primarily directed to the ordinarily employed gelatino-silverhalide developing-out emulsions. The dyes are ordinarily incorporated in the washed, finished emulsions and should, of course, be uniformly distributed throughout the emulsion. The concentration of the dyes in the emulsions can vary widely, i. e. from about 5 to about 100 mg. per liter of flowable emulsions. The concentration of the dye will vary according to the type of light-sensitive material in the emulsion and according to the effect desired. The suitable and most economical concentration for any given emulsion will be apparent to those skilled in the art upon making the ordinary tests and observations customarily employed in the art of emulsion making. To prepare a gelatino-silver-halide emulsion sensitizing with one of these dyes, the following procedure is satisfactory. A quantity of the dye is dissolved in methyl alcohol or other suitable solvent, and a volume of this solution (it may be diluted with water) containing from 5 to 100 mg. of dye is slowly added to about 1000 cc.

of gelatino-silver-halide emulsion, with stirring. Stirring is continued until the dye is uniformly distributed throughout the emulsion. With most of these sensitizing dyes, 10 to 20 mg. of dye per liter of emulsion suffices to produce the maximum sensitizing effect with the ordinary gelatino-silver-bromide (including bromiodide) emulsions. With gelatino-silver-chloride emulsions somewhat larger concentrations are required to produce the optimum sensitizing effect. The above statements are only illustrative and are not to be understood as limiting our invention, as it will be apparent that these dyes can be incorporated by other methods in the photographic silver halide emulsions customarily employed in the art. For instance, the dyes may be incorporated by bathing a plate or film upon which an emulsion has been coated in a solution of the dye in an appropriate solvent. Bathing methods, however, are not to be preferred ordinarily.

In condensing the 3-methylisoquinoline alkyl quaternary salts with p-dialkylaminobenzaldehydes in accordance with our invention, we have found it advantageous to add a secondary amine having an ionization constant greater than $10^{-5}$ at 25° C., e. g. piperidine, to a fused melt of the 3-methylisoquinoline alkyl quaternary salt and the p-dialkylaminobenzaldehyde. This procedure gives much higher yields than can be obtained according to Example 1. The p-dialkylaminobenzaldehyde is advantageously employed in excess, e. g. an excess of from about 25% to about 150% by moles. The following examples will serve to illustrate further this advantageous process.

*Example 6.—3 - p-dimethylaminostyrylisoquinoline ethiodide*

1.50 g. (1 mol.) of 3-methylisoquinoline ethiodide and 0.75 g. (1 mol.) of p-dimethylaminobenzaldehyde were fused together to give a melt and to the hot melt was added 1 cc. of piperidine. The reaction mixture was then heated for 10 minutes at 135 to 140° C. The reaction mixture was allowed to cool and the resulting cake of dye crystals was broken up, washed with diethyl ether, allowed to stand in acetone, filtered from the acetone and then washed with hot water. The water-washed product was stirred, in a beaker, with hot acetone and the suspension was chilled at 0° C. The dye was then collected on a filter and washed with acetone. The yield of dye was 61%. After recrystallization from methyl alcohol, the yield was 58% and the dye melted at 271–272° C. with decomposition.

*Example 7.—3 - p-dimethylaminostyrylisoquinoline methiodide*

This dye was prepared as in Example 6, using 1.43 g. (1 mol.) of 3-methylisoquinoline methiodide instead of 3-methylisoquinoline ethiodide with (1) 0.75 g. (1 mol.) of p-dimethylaminobenzaldehyde and with (2) 1.49 g. (1 mol.+100% excess) of p-dimethylaminobenzaldehyde. The yield of dye in the first case was 67% and after one recrystallization (two crops) from methyl alcohol 60%; in the second case, 79% and after one recrystallization (two crops) from methyl alcohol 74%. The dye melted at 285–286° C. with decomposition.

Conversion of any of the dye iodides describes herein to dye chlorides can be accomplished by heating the dye iodides with silver chloride in a phenol according to the process described in United States Patent 2,245,249, dated June 10, 1941.

What we claim as our invention and desire to be secured by Letters Patent of the United States is:

1. The carbocyanine dyes which are represented by the following general formula:

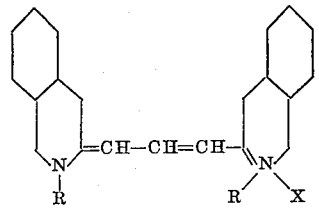

wherein R represents an alkyl group and X represents an anion.

2. The carbocyanine dyes which are represented by the following general formula:

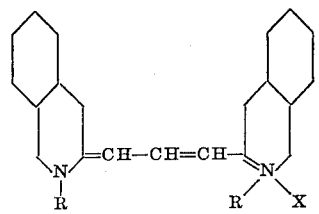

wherein R represents a primary alkyl group of the formula $C_nH_{2n+1}$ wherein $n$ represents a positive integer of from 1 to 4, and X represents a halide anion of atomic weight between 35 and 127.

3. The carbocyanine dye which is represented by the following formula:

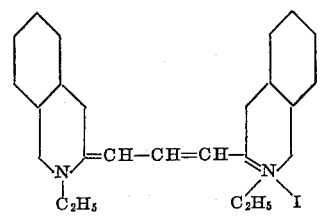

4. The carbocyanine dye which is represented by the following formula:

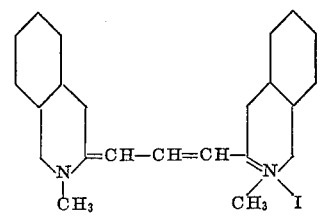

5. The carbocyanine dye which is represented by the following formula:

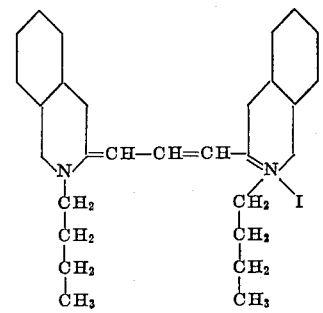

FRANK L. WHITE.
LESLIE G. S. BROOKER.

(References on following page)

REFERENCES CITED

The following references are of record in the file of this patent:

UNITED STATES PATENTS

| Number | Name | Date |
|---|---|---|
| 2,108,484 | Hamer | Feb. 15, 1938 |
| 2,201,816 | Middleton | May 21, 1940 |
| 2,338,782 | Reister | Jan. 11, 1944 |

FOREIGN PATENTS

| Number | Country | Date |
|---|---|---|
| 576,532 | Germany | May 17, 1933 |